United States Patent
Bouhot

[15] 3,675,745
[45] July 11, 1972

[54] DOUBLE ACTING FREE WHEEL

[72] Inventor: Marcel Pierre Alexis Bouhot, 35 Avenue de General Serrail, Paris, France

[22] Filed: March 9, 1971

[21] Appl. No.: 122,306

[52] U.S. Cl. .................................. 188/134, 192/56 R
[51] Int. Cl. .................................................. B60t 7/12
[58] Field of Search ............ 188/134, 136, 180, 184; 192/7, 192/8 R, 56 R

[56] References Cited

UNITED STATES PATENTS

| | | | |
|---|---|---|---|
| 3,329,243 | 7/1967 | Gibb | 188/134 |
| 3,499,511 | 3/1970 | Bouhot | 188/134 X |
| 3,596,740 | 8/1971 | Nau | 188/134 |

*Primary Examiner*—Duane A. Reger
*Attorney*—Paul Smolka

[57] ABSTRACT

A torque limiting device for stopping a rotating operating shaft when a resisting torque exerted thereon exceeds a predetermined value. A housing having a stationary bowl mounted therein is provided; the operating shaft is mounted for rotation in the housing and extends through a tubular element which has a pinion wheel thereon operatively connected to an actuator device. An annular member is provided at one end of the tubular element and a plurality of rollers are arranged in the annular member and maintained in contact with a cam mounted for rotation to the operating shaft and out of contact with the bowl by a plurality of springs. At the other end of the tubular element is provided sloping surfaces which are shaped to mate with oppositely sloping surfaces provided on a driver mounted for rotation with the operating shaft. A spring is provided to normally maintain the sloping surfaces in mating engagement with each other and is calibrated so that if the resisting torque acting on the operating shaft exceeds a predetermined value, the sloping surfaces move out of mating engagement thereby displacing the cam relative to the annular member to wedge the rollers into engagement with bowl and bring the shaft to a stop.

1 Claim, 3 Drawing Figures

DOUBLE ACTING FREE WHEEL

The present invention concerns a variant of the mechanical torque limiting device combined with disconnection means described in French Pat. No. 1,534,736.

In the embodiment of the above-mentioned device the transmission of the movement is effected through the intermediary of a driver comprising male and female sloping surfaces constantly subjected to the action of a spring initially under compression and acting as a torque measuring device, and a so-called "Autolock" system comprising a stationary circular bowl having therein a central cam which can be locked in the bowl by means of a wedging of rollers or freed relative to the bowl when a disconnection ring which is concentric with the bowl and the central cam and interposed therebetween acts through fingers with which it is provided against the rollers that it unwedges. The disconnection ring normally mounted for rotation by splines with a part of the driver then disconnects the central cam in order that it can turn under the action of the driver or on the contrary stops the movement when the resisting torque increases undesirably by the fact that by reaction the cams exert on the driver a force greater than that of the spring and by the fact that the driver in its axial movement disengages with the disconnection ring which, thus free, permits the rollers to wedge the central cam in the bowl.

In such an arrangement the rollers constantly rub against the interior wall of the stationary bowl which can be a disadvantage owing to the wear of the rollers in the case of prolonged operation.

An aim of the present invention is to overcome this disadvantage by modifying the device described in the above-mentioned French patent.

The present invention consists in a device comprising a driver provided with sloping surfaces fixed for rotation by splines or a key to an operating shaft and acts, owing to a calibrated spring initially under compression, as means for measuring an excessive torque and drives by means of oppositely sloping surfaces a part such as a pinion connected directly or indirectly to an actuating member, this pinion rotatably drives by means of an annular extension integral therewith, concentric with the shaft and provided with suitable grooves, a series of cylindrical rollers leaf-springs fix to the said annular extension are constantly in engagement with the inclined surfaces of a part having as many inclined surfaces as there are rollers and formed as a cam fixed for rotation with the operating shaft, during normal rotation of the operating shaft the said rollers are maintained under the action of the said springs at a slight distance from the interior wall of the stationary bowl serving as a casing for the unit, but are forcibly brought into engagement against the said interior wall as soon as the torque required by the actuating member exceeds a predetermined value and owing to the sloping surfaces acting as the drive for the operating shaft fixed both with the driver and the cam having multiple inclined surfaces instantaneously dephases with respect to the pinion, the said cam, also dephased, then exerts its wedging action which instantaneously causes the locking of the operating shaft.

Other features will be further brought out in the following description with reference to the accompanying drawings, in which:

FIG. 1 schematically shows in longitudinal section an embodiment of the present invention;

Figure 1:
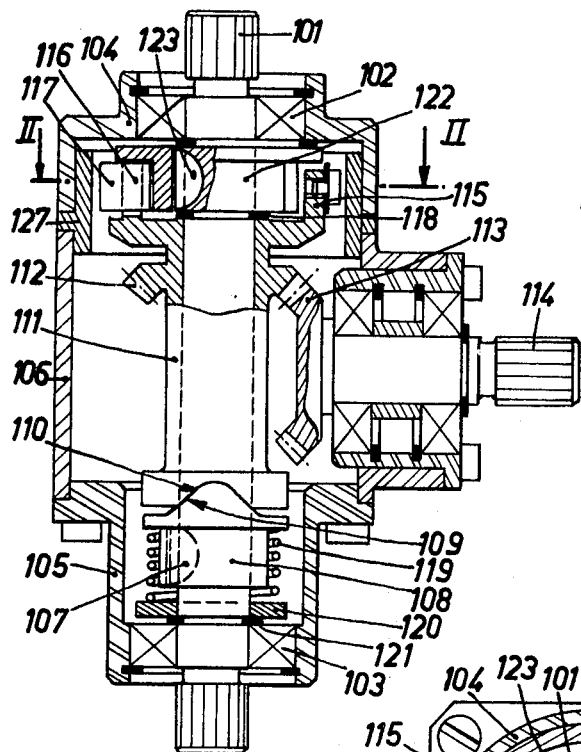

In the embodiment shown in FIG. 1 and provided merely by way of a non-limiting example, the present device comprises an operating shaft 101 mounted in bearings 102 and 103 housed respectively in casings 104 and 105 fixed on a central casing 106 by screws.

The operating shaft 101 rotatably drives through a key 107 a driver 108 provided with symmetrical sloping surfaces 109, for example male. These surfaces are normally in engagement with oppositely sloping surfaces 110 provided at one end of a tubular element 111 concentric with the operating shaft 101 and a bevel pinion 112, for example, is provided at the other end of the element 111 and is continuously in mesh with a bevel wheel 113 fixed to an output shaft 114 connected to an actuating member (not shown).

The tubular element 111 ends with an annular extension or member 115 (shown both in FIGS. 2 and 3) comprising milled slots or grooves 116, for example in which are housed rollers 117. The tubular element 111 axially abuts against stop portions 118 fixed to the shaft 101. The tubular element 111 is moreover urged against this portion by a spring 119 which bears against the collar of the driver 108 and the abutment 120 which in turn bears against a stop portion 121. The spring 119 is calibrated so that the sloping surfaces 109 and 110 only begin to disengage when the resisting torque opposed by the tubular element 111 reaches a predetermined value.

The device further comprises a cam 122 concentric to the shaft 101 and fixed thereto by a key 123 and disposed inside the annular extension 115 which is disposed at the other end of the tubular element 111. The cam 122 includes inclined surfaces 124 which for example are flat and normally oriented perpendicular to the axes of the slots 116. The rollers 117 act against the inclined surfaces at their center by the leaf springs 125 fixed by screws 126 to the annular extension 115 dimensioned to resist the centrifugal force to which each roller is subjected when the shaft 101 turns.

Figure 2:
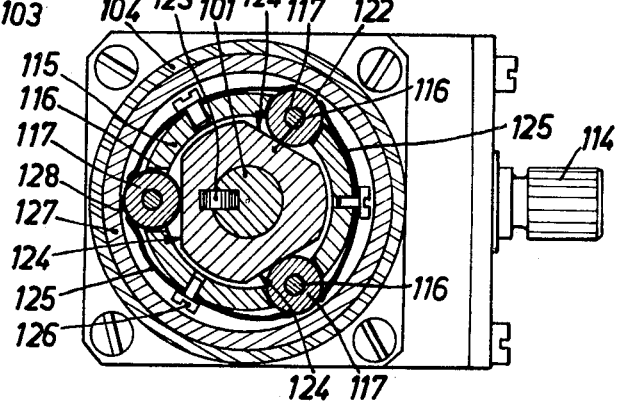
FIG. 2 shows the device in cross-section along the line II—II of FIG. 1, the locking device being in its unlocked position.

By construction, when the sloping surfaces 109 and 110 of the driver 108 and the tubular element 111 respectively are completely engaged, there is still a slight clearance of several tenths of a millimeter, visible at 128 in FIG. 2 between the rollers 117 and the interior wall of the stationary bowl 127 fixed to the casing 104 and 106. The entire unit is therefore free to turn without the rollers 117 continually rubbing against the interior wall of the bowl 127.

On the other hand, if the resisting torque on the actuating member exceeds a predetermined set value, a function of the slope of the sloping surfaces 109 and 110 and the force of the spring 119, the sloping surfaces 109 and 110 disengage, and according to the case the tubular element 111 stops rapidly or slows up and dephases relative to the operating shaft 101.

Figure 3:
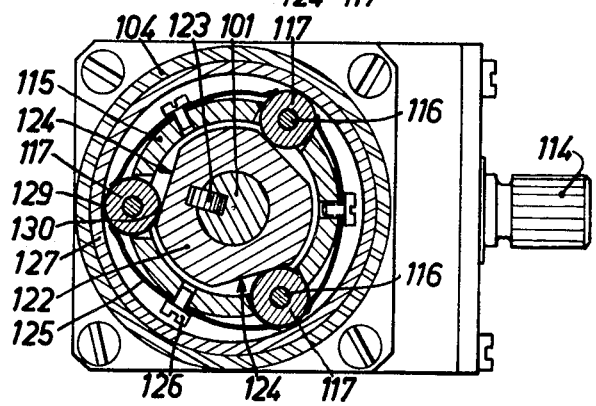
FIG. 3 shows a similar cross-section of the device but in which the locking device is in its locking position relative to the operating shaft.

As soon as the relative dephasing shown in FIG. 3 occurs, the inclined surfaces 124 while shifting relative to their normal position move the rollers 117 disposed in the slots 116 outwardly. When the dephasing reaches a sufficient value, the clearance 128 is taken up and the rollers come into contact with the interior wall of the bowl 127.

If at the moment this contact takes place, the planes tangent to the bowl passing through the generatrices 129 and 130 at which the rollers 117 are in contact with the interior of the bowl 127 and the inclined surfaces 124 form an angle therebetween of approximately 10°, a value that can easily be obtained by suitable adjustment of the clearance 128; a locking of the operating shaft 101 is instantaneously obtained by the wedging of the rollers 117 under the effect of the inclined surfaces 124 on the cam 122 fixed to the shaft 101 in the bowl 127.

If the operating shaft is acted upon by an actuating device comprising a device shown in FIGS. 1 and 2 of the above-mentioned French patent, the overloading which is produced at the moment of braking of the shaft of the steering gear which connects it to the actuating unit causing the disconnection of the "Autolock" drive thereof. If the actuating unit is simply provided with a friction torque-limiting device, the torque-limiting device will begin to slide as soon as the steering gear is locked.

The reverse operation is also possible since, as soon as the shaft 101 is driven in the opposite direction, the inclined surfaces 124 will tend to separate from the rollers 117 which will cause the wedging action to disappear and the inclined surfaces 109 and 110 will come back into phase in their normal fully engaged position.

It is seen in the present device that the rollers 117 only come in contact with the interior wall of the bowl 127 if the torque required by the member exceeds a predetermined value and that the operating shaft dephases instantaneously with respect to the pinion 112, the rollers then come to lock against the interior wall while the cam 122, also dephased, exerts its wedging action thereby instantaneously causing the disconnection of the operating shaft 101.

The device according to the invention is useful in all machines or apparatus having rotating members requiring the braking of the operation shaft as soon as the resisting torque exceeds a predetermined value.

What is claimed is:

1. A torque limiting device comprising a housing, a stationary bowl fixed in said housing, an operating shaft mounted for rotation in said housing and extending through a tubular element adapted to be connected to an actuating device, a cam mounted for rotation with the operating shaft and mounted concentric therewith, an annular member mounted at one end of the tubular element and disposed between the cam and the bowl, resilient means maintaining the rollers in contact with associated portions of the cam and normally spaced from the cam, a driver mounted for rotation with the operating shaft and axially spaced from the cam, a sloping surface provided at the end of the tubular element remote from the annular member matingly engageable with, cooperating sloping surfaces on the driver, a spring means for normally maintaining the sloping surface in mating engagement with one another, the spring means being calibrated so that if the torque required by the actuating device exceeds a predetermined value the sloping surfaces are displaced relative to one another which in turn causes the cam to be displaced relative to the annular member thereby urging the rollers into contact with the bowl to lock the operating shaft.

* * * * *

UNITED STATES PATENT OFFICE
CERTIFICATE OF CORRECTION

Patent No. 3,675,745          Dated  July 11, 1972

Inventor(s) Marcel Pierre Alexis Bouhot

It is certified that error appears in the above-identified patent and that said Letters Patent are hereby corrected as shown below:

On the first page of the patent in the introductory portion insert the following:

[32]   Priority    July 15, 1970
                   France
                   70/26075

Signed and sealed this 24th day of October 1972.

(SEAL)
Attest:

EDWARD M. FLETCHER, JR.              ROBERT GOTTSCHALK
Attesting Officer                    Commissioner of Patents